Aug. 19, 1941.  R. HIGGINS  2,253,295
BREATHER FOR LIQUID CONTAINERS
Filed Aug. 3, 1938

INVENTOR
Ralph Higgins
BY *Alpheus J. Crane*
ATTORNEY

Patented Aug. 19, 1941

2,253,295

UNITED STATES PATENT OFFICE 2,253,295

BREATHER FOR LIQUID CONTAINERS

Ralph Higgins, Akron, Ohio, assignor to The Ohio Brass Company, Mansfield, Ohio, a corporation of New Jersey Application August 3, 1938, Serial No. 222,826

7 Claims. (Cl. 220—85)

This invention relates to expansion chambers for liquid containers, and particularly to expansion chambers for housings for electrical apparatus which are filled with insulating liquid.

One object of the invention is to prevent deterioration of the liquid contained in the housing due to contact with the atmosphere.

A further object of the invention is to provide breathing apparatus for a liquid filled housing which will reduce to a minimum the amount of contact between the liquid in the housing and the outer atmosphere, and at the same time, will maintain a pressure within the housing which shall differ but slightly from atmospheric pressure.

A further object of the invention is to provide for substantially free breathing while reducing to a minimum the exchange of air between the space adjacent the liquid within the housing and the outer atmosphere.

A further object of the invention is to provide a seal for the liquid contained in the housing which shall exclude the atmosphere from contact with the liquid within the housing for a given range of temperature changes, but which shall permit exchange of air between the space adjacent the liquid and the outer atmosphere for greater temperature changes.

A further object of the invention is to provide means for drying the air that passes into the chamber adjacent the liquid within the housing.

A further object of the invention is to provide means for removing moisture from the sealing liquid.

A further object of the invention is to provide means for renewing the sealing liquid.

A further object of the invention is to provide a sealed joint for the housing which will seal the interior of the housing against communication with the outer atmosphere and against communication with the interior of the conduit within the housing.

A further object of the invention is to provide a method and apparatus which shall be of improved construction and operation.

Other objects and advantages will appear from the following description.

The invention is exemplified by the combination and arrangement of parts shown in the accompanying drawing and described in the following specification, and it is more particularly pointed out in the appended claims.

There are many kinds of apparatus comprising a liquid contained in a housing in which it is desirable to exclude or limit contact of the liquid with the outer atmosphere. Electrical apparatus contained in a housing and surrounded by insulating liquid is one instance of this kind. In many forms of electrical apparatus, such as transformers, switches, bushing insulators, etc., it is customary to fill the apparatus housing with an insulating liquid such as transil oil. There is a tendency for this oil to deteriorate in time forming a precipitate, usually referred to as sludge, and it has been found that the instability and sludging of oil used in most electrical equipment is due chiefly to the action of ultra-violet rays from sunlight, oxidation caused by contact with the air, presence of moisture in the oil, and the effect upon the oil of its contact with various materials, such as metal and insulating media within the housing. Of these causes, it has been found that moisture in the oil is probably the greatest, and that contamination from the other causes is greatly accelerated by the presence of moisture. For this reason, it is very important to exclude moisture from insulating oil in electrical equipment. Insulating oil, however, expands and contracts with temperature changes, and to accommodate this expansion and contraction, it has been customary to provide some form of expansion chamber which communicates through a breathing opening with the outer atmosphere. This breathing could, of course, be avoided by sealing the expansion chamber and providing sufficient gas filled space within the chamber to accommodate the expansion and contraction of the liquid. Such an arrangement, however, necessarily involves a certain amount of pressure change within the chamber due to the compression and expansion of the gas above the liquid.

The present invention avoids the necessity of completely sealing the expansion chamber, but at the same time, reduces the interchange of gas between the space above the filling liquid and the outer atmosphere to such an extent that the amount of moisture brought into contact with the liquid by the breathing action is negligible, particularly in view of the fact that means is provided for passing the air which actually enters the expansion chamber proper through a drying medium. This is accomplished in the present invention without necessity of passing the normal ebb and flow of air through this medium.

Figure 1:
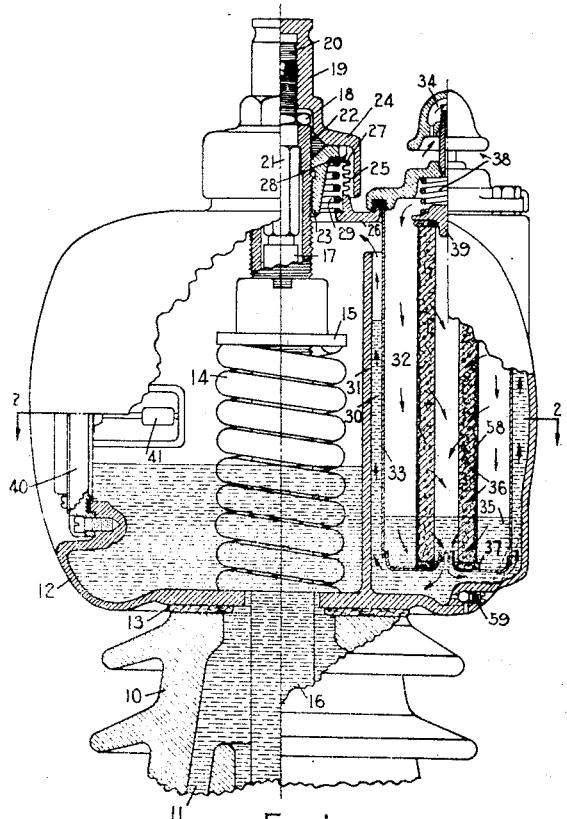
Fig. 1 is an elevation with parts in section showing one embodiment of the present invention.

In Fig. 1 of the drawing the numeral 10 designates the upper end of an insulating bushing which is filled with transil oil or other insulating liquid 11. Expansion chamber 12 is mounted on the upper end of the bushing 10, a gasket 13 being interposed between the two parts to provide a liquid tight joint. The expansion chamber is held in place on the gasket 13 by a spring 14 which engages a stop 15 on a tube 16 extending through the bushing 10. The conductor 17 is brought up through this tube 16 and secured to the upper end of the tube by a nut 18. A blind terminal nut 19 is threaded on the upper end 20 of a fitting 21 secured to the conductor 17, the terminal nut bearing against packing 22 which engages the upper end of the tube 16, and also the upper inclined face of a ring nut 23 threaded onto the tube 16. The packing 22 provides a seal so that air may not enter the space within the expansion chamber 12 either from the outer atmosphere or from the space within the tube 16. It should be noted that the terminal 19 is screwed down upon the packing 22 until the lower face of the radial flange 24 on the terminal engages the upper face of the ring nut 23 providing a firm metallic seat for the terminal. This prevents any relative movement of the surfaces bearing upon the packing 22 so that the tightness of the joint is not disturbed by force exerted upon the terminal 19.

In order to provide for differential expansion of parts for the housing, and at the same time seal the opening between the ring nut 23 and the cover for the expansion chamber 12, a thin metal baffle 25, which is corrugated to permit longitudinal expansion and contraction, is soldered at its lower end to the rim 26 surrounding the opening in the cover for the expansion chamber. The upper end of the baffle 25 is soldered to a flat ring 27 which engages a gasket 28 bearing against a shoulder on the ring nut 23. A tight joint is maintained at the gasket by a spring 29.

A separate compartment 30 is formed within the expansion chamber 12 by means of a wall or baffle 31, the compartment being closed at its lower end but opening into the upper part of the expansion chamber at its upper end. Within the compartment 30 is a second compartment 32 which is separated from the compartment 30 by a metal tube 33 which is supported from the cover on the expansion chamber and which is connected to the outer atmosphere through a breather 34. Communication between the outer atmosphere through the breather 34 and the interior of the expansion chamber 12 is limited by a sealing liquid 35 contained within the compartments 30 and 32, the surface of the liquid within the compartment 32 being subject to atmospheric pressure and the surface of the liquid within the compartment 30 being subject to the pressure within the expansion chamber 12.

It will be understood that when the liquid 11 expands or contracts, the surface levels of the liquid within the compartments 30 and 32 will vary relative to each other and that the pressure on the surface of the liquid within the expansion chamber will differ from atmospheric pressure only by an amount corresponding to the difference in head of the liquid in the two compartments. Expansion and contraction of the oil in the bushing 10 will cause a variation in the surface level of the two compartments 30 and 32, but so long as the surface level in both compartments remains above the bottom of the tube 33, there will be no exchange of air between the interior of the expansion chamber and the outer atmosphere. The compartments 30 and 32 are made of such a size that the normal daily fluctuation of temperature will not cause an interchange of air between the expansion chamber and the outer atmosphere. Of course, these compartments could be made large enough to accommodate the extreme variations in the volume of oil in the bushing, including those due to the difference between winter and summer temperature, but this would require an excessively large expansion chamber, which in many cases, will be objectionable for various reasons. Furthermore, applicant has discovered that extreme variations in the volume of the oil in the bushing are of small consequence insofar as contamination of oil by contact of the atmosphere is concerned, and that it is the daily breathing that is most apt to cause trouble. Applicant, therefore, has provided a breathing apparatus having a trap of sufficient size to preclude interchange of air due to the ordinary daily variations in temperature, but which permits interchange of air to accommodate the extreme variations due to seasonal changes. However, applicant has a de-humidifying medium comprising a tubular member 36 of moisture absorbing material. Any material having the desired properties may be used for this purpose, but applicant has found it advantageous to use a material known in the trade as "activated alumina" which is aluminum oxide suitably granulated and roasted to render it extremely efficient in the absorption of moisture. This is a material which may be bought upon the market and may be obtained from the Aluminum Company of America having its principal office in Pittsburgh, Pennsylvania. The granules or crystals of activated alumina are preferably mixed with a suitable binder and baked to form the tubular member 36 which is supported at the lower end of the tube 33, the interior of the tube 36 being in communication with the chamber 30 and sealed against communication with the chamber 32 by a gasket 37. The tube 36 may be held in place by a spring 38 and contact cap 39. It will be apparent that any air which enters the compartment 30 must first pass through the walls of the tube 36 from the compartment 32 to the interior of the tube 36.

In the ordinary breathing of the apparatus the main flow of air will be to and from the portion of the compartment 32 outside of the tube 36 and only a small portion of the air would pass through the wall of the tube so that the tube will not be clogged by absorption of moisture from the main volume of the air passing into and out of the compartment 32 under ordinary breathing. When an extreme decrease in temperature occurs, however, which will lower the surface level of the oil in compartment 32 below the lower end of the tube 33, air will pass, in the direction indicated by the arrows, from the compartment 32 into compartment 30 and bubble through the oil in the compartment 30 to enter the expansion chamber. Any such air entering the expansion chamber will, of necessity, have to pass through the wall of the tube 36 so that it will be freed from moisture due to the action of the activated alumina, of which the tube 36 is composed. It will also be apparent that any oil which passes from the compartment 32 to the compartment 30 must first pass through the wall of the tube 36 so that the oil in the chamber 30 will be freed from moisture and the air bubbling up through this chamber will not pick up moisture from the oil.

An opening is provided in one side of the expansion chamber 12 for receiving a plate 40 carrying a magnetic oil gage 41. This opening may be made large enough to insert the spring 14 and other parts within the expansion chamber so that the opening at the top of the expansion chamber may be kept small.

Figure 2:
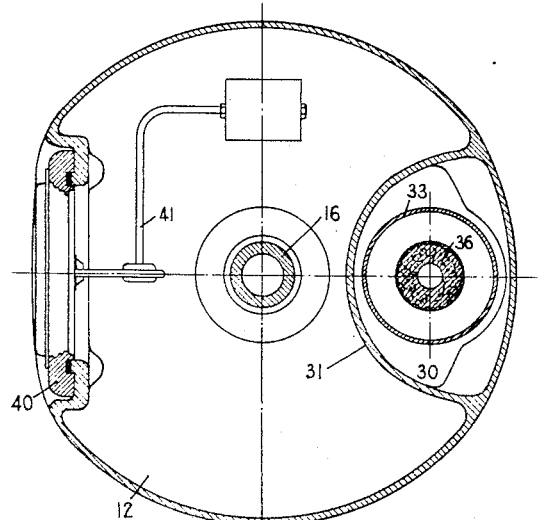
Fig. 2 is a horizontal section substantially on line 2—2 of Fig. 1.
Figure 3:
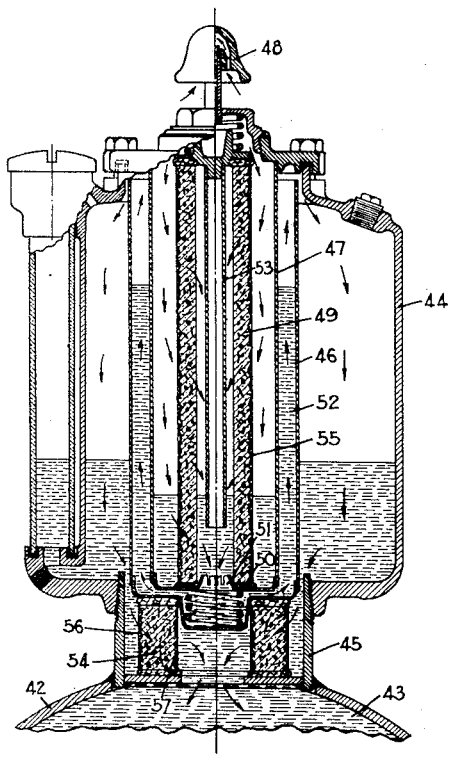
Fig. 3 is a view similar to Fig. 1 showing a modified form of the invention.

Fig. 3 shows an embodiment of the invention adapted to an expansion chamber applied to a device in which there is no necessity for the conductor to extend through the expansion chamber. In this figure, the numeral 42 designates a housing of any kind having liquid 43 therein and having an expansion chamber 44 connected to the housing by a short tube 45. A metal cup 46 open at its top and closed at its bottom is supported within the expansion chamber 44 and has a second cup 47 disposed within the cup 46 and communicating with the outer atmosphere through a conventional breather 48. A tube 49 of de-humidifying material is mounted within the cup 47 and is sealed at its lower end by a gasket 50 from communication with the space outside of the de-humidifying material. The lower end of the tube communicates through opening 51 with the outer cup 46. The space within the cups 46 and 47 is provided with a sealing liquid 52 which permits limited expansion and contraction of the liquid in the expansion chamber 44 without interchange of air between the expansion chamber and the outer atmosphere but which permits of this exchange of air for extreme variations of the surface level in the expansion chamber in a manner similar to the sealing liquid shown in Fig. 1. For normal daily breathing, the principal ebb and flow of air through the breather 48 is to and from the outer portion of the space within the cup 47, but when sufficient variation occurs to produce interchange of air between the expansion chamber and the atmosphere, this air will have to pass through the wall of the tube 49 and have its moisture removed therefrom. Of course, during normal daily breathing, a small amount of air will pass through the wall of the tube 49 into and out of the space within the tube, but this passage will be very slight and may be still further restricted by reducing the space within the tube 47 by a filler tube or rod 53.

Further elimination of moisture from the oil entering the housing 42 may be effected by a housing support 54 formed of de-humidifying material and placed beneath the cup 46 in such position that any interchange of oil between the expansion chamber and the housing 42 must take place through the wall of this support. The tube 49 and the support 50 may be reinforced by a metal screen in contact with the surface of the de-humidifying material, the screen being shown at 55 about tube 49 and at 56 and 57 on the surface of the support 54. A similar screen 58 is shown surrounding the tube 36 in Fig. 1. In this figure a drain opening 59 is provided for renewing the sealing liquid in the chambers 30 and 32 in case the liquid becomes contaminated. In Fig. 3 the sealing liquid may be renewed by removing the cover from the expansion chamber 44 and lifting the cup 46 from the chamber.

Figure 4:
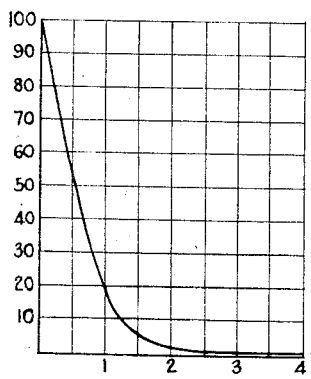
Fig. 4 is a curve illustrating the operation of the invention.

The curve shown in Fig. 4 illustrates the practical operation of the invention. In the curve the vertical distances represent the amount of breathing that takes place between the interior of the expansion chamber and the outer atmosphere indicated in percentage of the total breathing that would take place if there were no seal present. The horizontal distances represent the volume of one leg of the seal in percent of the total volume of oil in the bushing. The curve represents the performance of the invention over a period of a year's time during which there is a maximum variation of temperature of 95° F. and an average daily variation of 22° F. It will be seen from this curve that the most advantageous volume for each leg of the trap is between 1 and 2% of the total volume of liquid in the container. For any volume greater than 2% the size greatly increases without materially decreasing the percentage of breathing and for any volume less than 1% the amount of breathing rapidly increases so that the efficiency of the device is greatly decreased. I prefer to use a trap in which the volume of each leg is approximately 1½% of the total volume of the liquid or the total volume of the trap is approximately 3% of the volume of the liquid.

It has been found advisable where a free breathing expansion chamber is used with a bushing, to provide a chamber having about 10% of the total amount of liquid in the bushing. A trap made according to the present invention would add approximately 3% of the total volume of the liquid to the size of the expansion chamber making the total size of the expansion chamber about 13% of the total volume of liquid. This would add a little less than ⅓ to the volume of the expansion chamber, and since the volume of the expansion chamber increases as the square of the diameter, the increase in diameter where the volume is increased by only 30% is of small importance compared to the results obtained. However, it is important that the proper size of trap be used as only a slight variation from the most effective size either greatly diminishes the efficiency of the trap or else increases the size of the expansion chamber without corresponding increase in efficiency.

I claim:

1. The combination with a container for liquid of a liquid seal for said container comprising two legs having a communicating passage connecting the lower ends of said legs and liquid in said passage and extending into said legs, the pressure in one leg being balanced against the pressure in the other through the liquid in said passage, said seal having one leg thereof communicating with the interior of said container and the other leg thereof communicating with the outer atmosphere, said last named leg having space therein connected with the outer atmosphere and with said passage and in which space said liquid rises and falls according to the pressure within said container and a treating medium interposed in the path of travel between said space and the other leg of said seal and arranged so that air may pass freely from said space to the outer atmosphere without passing through said treating medium but must penetrate said treating medium to travel from said space through said passage so that during normal limited breathing of said container the greater portion of the air passing to and from said seal will not penetrate said treating medium, but so that any air passing from the outer atmosphere to the space within said container must pass through said medium.

2. The combination with a container for liquid of a liquid seal for said container having one leg thereof communicating with the interior of said container and the other leg thereof communicating with the outer atmosphere, said last named leg being open at one end to the outer atmosphere and having a passage at the other end communicating with the other leg of said seal said legs and passage having liquid therein, the liquid in one leg being balanced against the liquid in the other leg through the liquid in said passage and a tubular member having the wall thereof formed of a porous treating medium and having one end thereof communicating with the passage between the legs of said seal, said tubular member being disposed in one of said legs and having the wall thereof separating said passage from the outer atmosphere so that any air flowing from the outer atmosphere through said passage must penetrate the wall of said tubular member.

3. The combination with an expansion chamber for liquid in a container of a seal for said expansion chamber comprising an outer and an inner compartment communicating at their lower ends through a passage connecting said compartments and having their upper ends communicating with the interior of said expansion chamber and with the outer atmosphere respectively, and a tubular member of a porous treating material disposed in one of said compartments and having the interior thereof communicating with the passage between said compartments and having the side wall thereof forming a treating medium through which fluid must pass to enter said passage.

4. The combination with a container for liquid having space for a cushion of gas in the upper portion thereof of a liquid trap for separating said space from the outer atmosphere while providing for limited expansion and contraction of the contents of said container by affording communication between said space and the atmosphere for extensive expansion or contraction of said contents, said trap comprising two legs communicating with each other at their lower ends, a liquid for sealing the communication between said legs, the upper ends of said legs communicating respectively with said space and with the atmosphere, and an absorption baffle in the path of flow between said legs and accessible for replacement through the leg communicating with the atmosphere while communication between said legs remains sealed by said liquid the leg which communicates with the atmosphere having space therein connected with the atmosphere and into which said liquid extends and which is separated by said baffle from the other leg.

5. The combination with a container for liquid, said container having space in the upper portion thereof for a cushion of gas, of a liquid trap for separating said space from the outer atmosphere while providing for limited expansion and contraction of the contents of said container by affording communication between said space and the atmosphere for extensive expansion or contraction of said contents, said trap comprising an outer and inner compartment communicating with each other at their lower ends, the upper end of the outer compartment communicating with said space while the upper end of inner compartment communicates with the outer atmosphere, a liquid for sealing the communication between said compartments at the lower ends thereof, and a treating baffle interposed in the path of flow from one of said compartments to the other, said baffle being accessible from the upper end of the inner compartment for removal and replacement.

6. The combination with a container for liquid having space for expansion and contraction of said liquid, of a breather for said space comprising a seal having compartments connected by a passage, sealing liquid in said passage arranged to extend into said compartments to balance the pressures in said compartments against each other through the liquid in said passage and to seal said passage against transfer of gas therethrough for a limited differential of pressure between said compartments, said liquid being displaceable by a predetermined pressure deferential to allow transfer of gas from one compartment to the other, a gas treating medium disposed in the path of gas passing through said passage, one of said compartments being connected with the space within said container and the other of said compartments having expansion space therein extending from the surface of said liquid and communicating with the outer atmosphere, said treating medium being disposed at the side of said expansion space toward said passage and away from the connection between said expansion space and the outer atmosphere so that fall and rise of liquid in said expansion space causes flow of air to and from said expansion space without passing through said treating medium, but so that any air flowing from said expansion space through said passage must pass through said treating medium.

7. The combination with a container for liquid having closed space for expansion of the liquid in said container, of a breather for said space comprising a seal interposed between said space and the outer atmosphere, said seal having two compartments connected by a passage, a sealing liquid disposed in said passage and adapted to extend into said compartments to balance the pressures in said compartments against each other and to prevent passage of gas from one compartment to the other for a limited pressure deferential between said compartments, but being displaceable to permit transfer of gas between said compartments when the pressure deferential exceeds a predetermined amount, one of said compartments being connected with the expansion space within said container, a gas treating medium in the form of a tube disposed within the other compartment and having the interior thereof connected with said passage, the wall of said tube separating the outer portion of said last mentioned compartment from said passage, said outer portion communicating with the outer atmosphere so that rise and fall of the liquid in said outer portion will cause air to flow to and from said portion without passing through the wall of said tube and so that any air passing from said outer portion to said passage must first penetrate the wall of said tube.

RALPH HIGGINS.